United States Patent
Bullock et al.

(10) Patent No.: US 6,282,225 B1
(45) Date of Patent: Aug. 28, 2001

(54) METHOD FOR ALIGNING A CYLINDRICAL LASER OPTICAL RESONATOR

(75) Inventors: Donald L. Bullock, Los Angeles; Chun-Ching Shih, Palos Verdes Estates; Richard A. Chodzko, Rancho Palos Verdes, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/231,918

(22) Filed: Jan. 14, 1999

(51) Int. Cl.$^7$ .............................. H01S 3/083; H01S 3/08; G01B 11/26
(52) U.S. Cl. .............................. 372/94; 372/95; 356/138; 356/152.1; 356/153
(58) Field of Search ........................ 372/94, 95; 356/138, 356/153, 152.1, 152.2, 152.3

(56) References Cited

U.S. PATENT DOCUMENTS

| | | |
|---|---|---|
| 3,575,669 | 6/1968 | Haeff . |
| 3,992,685 | 11/1976 | Ogren et al. . |
| 4,237,429 | 12/1980 | Hook et al. . |
| 4,514,698 | 4/1985 | Blumenthal et al. . |
| 4,516,244 | 5/1985 | Holmes . |
| 4,530,602 * | 7/1985 | Pomphery, Jr. ...................... 356/138 |
| 4,598,408 | 7/1986 | O'Keefe . |
| 4,606,036 | 8/1986 | Holmes . |
| 4,744,090 | 5/1988 | Freiberg . |
| 5,099,492 | 3/1992 | Zajdman et al. . |
| 5,624,654 | 4/1997 | Clendening, Jr. et al. . |
| 6,014,206 * | 1/2000 | Basting et al. ...................... 356/138 |

* cited by examiner

Primary Examiner—Frank G. Font
Assistant Examiner—Armando Rodriguez
(74) Attorney, Agent, or Firm—Robert W. Keller

(57) ABSTRACT

A method for aligning the optical surfaces of the high extraction annular ring resonator which includes a scraper mirror with a decentered aperture. A probe beam, from an external laser, is directed into the resonator cavity through the decentered aperture in the scraper mirror. The symmetrical properties of the probe beam near and far field intensity distribution patterns are used to align the optical surfaces within the cylindrical ring resonator.

5 Claims, 15 Drawing Sheets

METHOD FOR ALIGNING A CYLINDRICAL LASER OPTICAL RESONATOR

This invention was made with Government support under Contract No. F04701-96-C-0015 awarded by the Department of Defense. The Government has certain rights in this invention.

BACKGROUND OF THE INVENTION

1. Field of the Invention

The present invention relates to a method for aligning a cylindrical laser optical resonator and more particularly to a method for aligning a high extraction decentered annular ring resonator (HEXDARR).

2. Description of the Prior Art

Various types of lasers are known in the art. For example, chemical lasers are known. Examples of such chemical lasers are disclosed in U.S. Pat. Nos. 3,575,669; 3,992,685; 4,237,429; 4,514,698; 5,099,492; and 5,624,564, hereby incorporated by reference. In order to provide relatively high power lasers in a relatively compact configuration, lasers utilizing a cylindrical gain generator and an annular ring resonator have been developed. In such lasers, the cylindrical gain generator is disposed within an annular ring resonator. In such a configuration, the gain medium flows radially outwardly from the cylindrical gain generator into an annular gain volume of the cylindrical resonator. In order to extract the maximum amount of power from the annular gain volume, high extraction annular ring resonators have been developed, for example, as disclosed in U.S. Pat. Nos. 4,598,408 and 4,744,090, assigned to the same assignee as the present invention hereby incorporated by reference. Examples of other annular ring resonators are also disclosed in U.S. Pat. Nos. 4,606,036 and 4,516,214. The annular ring resonators, for example, as disclosed in the '408 patent, include a conical rear reflector, a waxicon, a reflaxicon, a scraper mirror with a decentered aperture and a plurality of flat beam steering mirrors forming a compact leg of the resonator. The decentered aperture in the scraper mirror allows a circular beam of light to be transmitted therethrough and reflected in the compact leg of the waxicon. The waxicon expands the circular beam into an annular light beam which makes a first pass through the annular gain volume. The annular beam is reflected by the conical rear reflector and thus makes a second pass through the annular gain volume. The annular beam reflected from the rear reflector is reflected to the reflaxicon, where the beam is compacted and a portion thereof reflected through the decentered aperture of the scraper mirror as feedback with the balance of the beam outcoupled as an output beam.

While such annular ring resonators provide relatively high gain, such resonators are not without disadvantages. For example, the alignment of the various optical surfaces within the resonators have heretofore been relatively difficult and require much more precision than standard spherical optical surfaces. Unfortunately, relatively small amounts of misalignment of the optical surfaces causes significant degradation of the optical quality of the coupled laser beam.

SUMMARY OF THE INVENTION

It is an object of the present invention to solve various problems in the prior art.

It is yet another object of the present invention to provide a simplified method for aligning the optical surfaces within a cylindrical ring resonator.

Briefly, the present invention relates to a method for aligning the optical surfaces of the high extraction annular ring resonator which includes a scraper mirror with a decentered aperture. A probe beam from an external laser is directed into the resonator cavity through the decentered aperture in the scraper mirror. The symmetrical properties of the probe beam near and far field intensity distribution patterns after the probe beam undergoes a single round-trip passage through the resonator are used to align the optical surfaces within the cylindrical ring resonator.

DESCRIPTION OF THE DRAWINGS

These and other objects of the present invention will be more fully understood with reference to the following specification and attached drawing wherein: The following abbreviations are used: CL refers to the system of mirrors in the feedback loop known as the compact leg, RC refers to the conical mirror known as the rear cone.

DETAILED DESCRIPTION

The present invention relates to a method for systematically aligning a cylindrical resonator, such as a high extraction decentered annular ring resonator (HEXDARR) to produce an output mode phase distribution quality not heretofore achieved consistently. The method in accordance with the present invention uses the near and far field patterns of a HEX-DARR laser which may be simulated, as illustrated in the accompanying figures, or may be generated experimentally to align the laser. For the purpose of visualizing these properties, the near and far fields may be simulated for a particular laser; however, as will be understood by those of ordinary skill in the art the principles of the present invention are applicable to other lasers. In particular, the alignment method in accordance with the present invention is based on observations of certain key types of misalignment, indicated by the appearance of certain features in the near and far field intensity distribution patterns of the alignment probe beam after it passes one round trip through the resonator. In addition, the probe beam if it is suitably masked upon exiting the aligned resonator can be made to have certain reflection symmetry properties which become important for determining the quality of the alignment.

Figure 1:
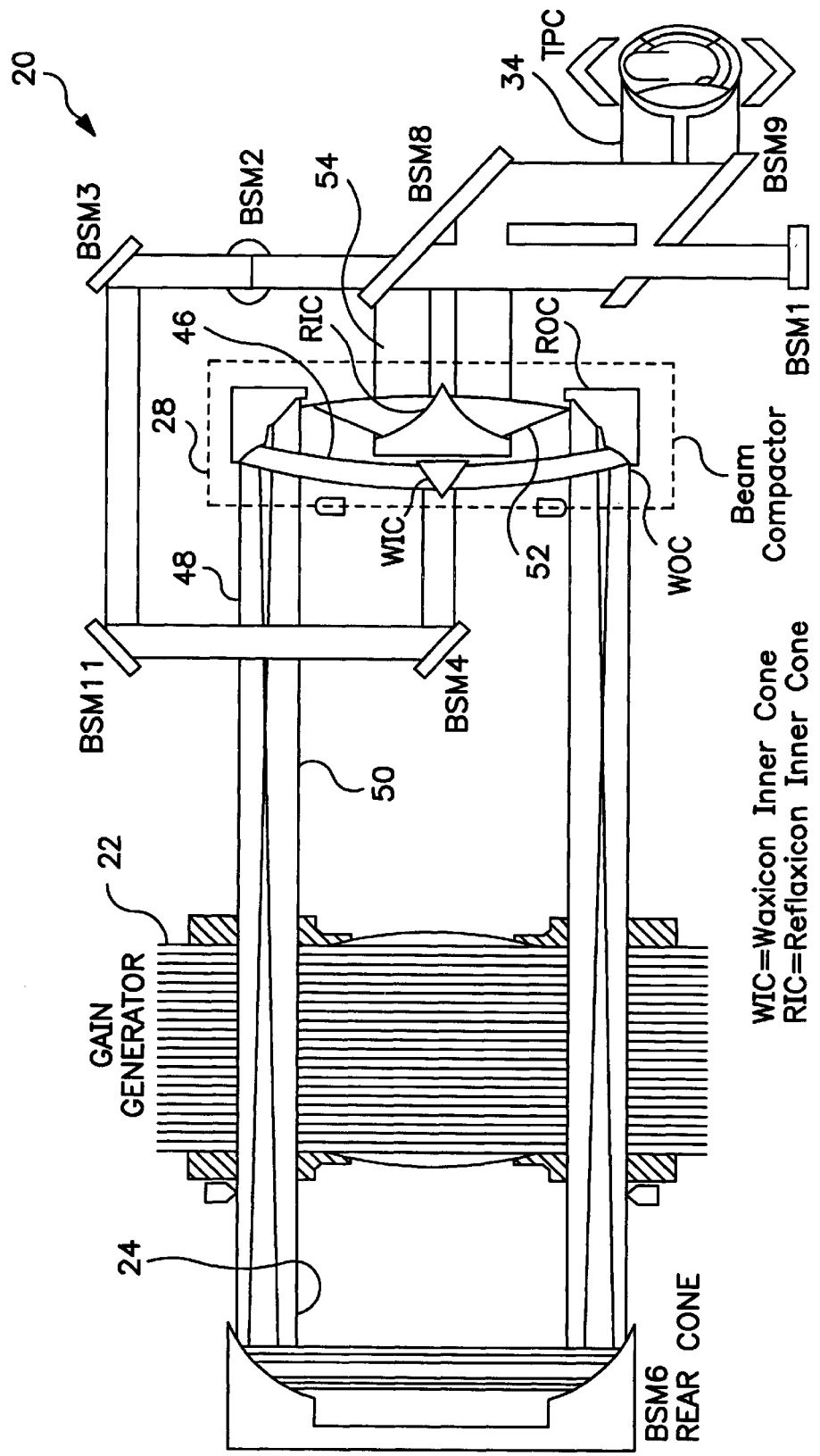
FIG. 1 is an elevational view of a high extraction annular ring resonator, shown with the housing removal.
Figure 2:
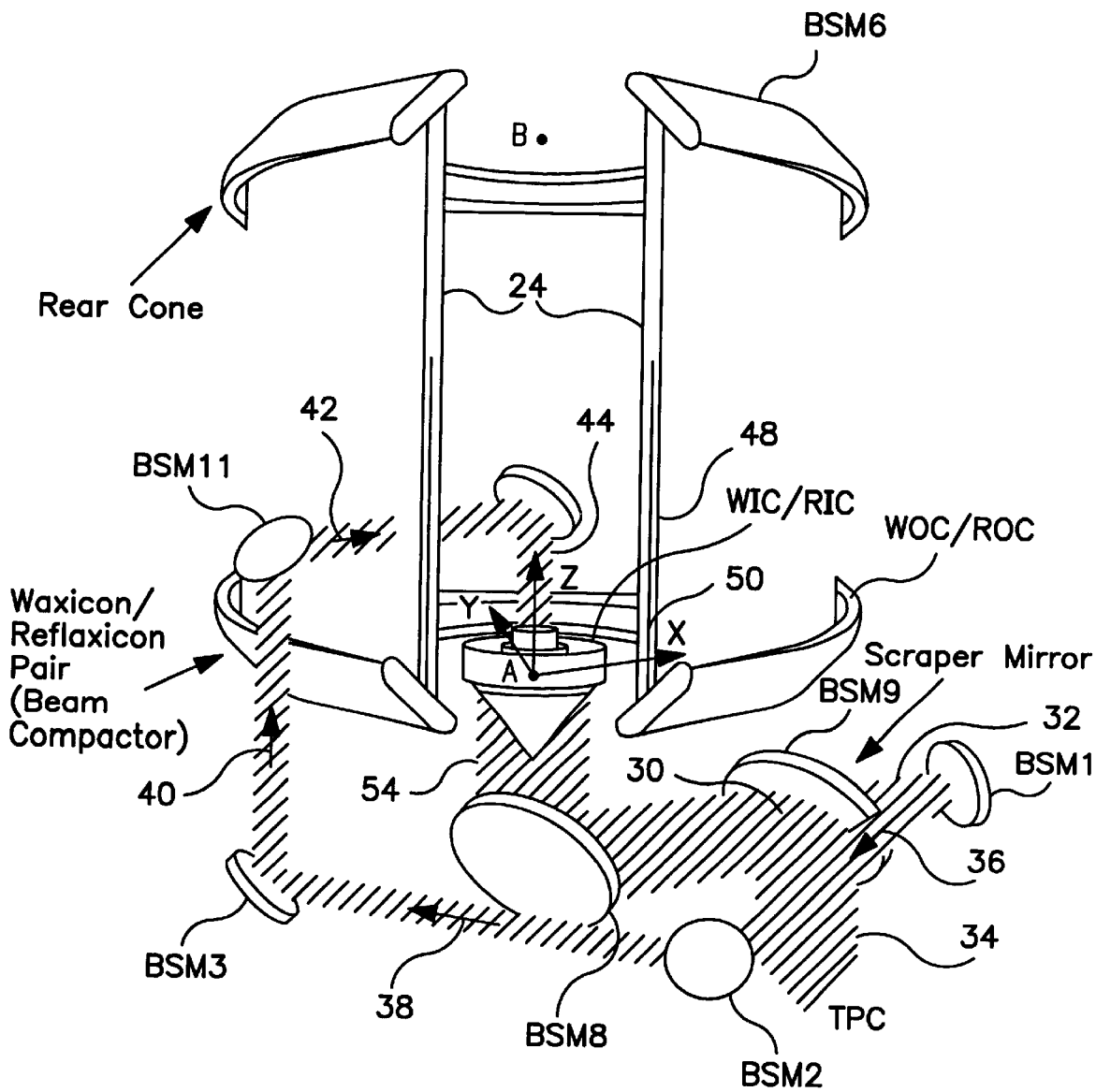
FIG. 2 is a simplified perspective view of the high extraction annular ring resonator illustrated in FIG. 1, shown with the housing and gain generator removed.

A high extraction decentered aperture ring resonator (HEXDARR) is illustrated in FIGS. 1 and 2 and generally identified with the reference numeral 20. The resonator 20 is adapted to be used with a high power continuous wave chemical lasers which include a cylindrical gain generator 22. As illustrated in FIG. 1, the gain generator 22 may be eccentrically disposed within the generally cylindrical resonator 20. As mentioned above, the gain medium from the gain generator 22 flows radially outward from the gain generator 22 and into an annular gain volume 24, the inner radius of which is defined by the exterior radius of the cylindrical gain generator 22 and the outer radius of which is defined by a downstream boundary where the flowing gain medium becomes absorbing. As will be discussed in more detail below, the high power gain of the laser is accomplished by a folded mode path through the annular gain volume 24. A compact leg, generally identified with the reference numeral 26, is used to provide feedback of the laser power to the annular gain volume 24 of the resonator. The compact leg 26 includes a plurality of flat beam steering mirrors BSM1, BSM2, BSM3, BSM4 and BSM11. The system also includes a rear cone mirror BSM6. As will be discussed in more detail below, the compact leg 26 provides feedback and directs a portion of the output beam back into the annular gain volume 24 for further amplification. The resonator 20 also includes a beam compactor system, illustrated within the box 28. The beam compactor system 28 includes a waxicon inner cone (WIC), a waxicon outer cone (WOC), a reflaxicon inner cone (RIC), and a reflaxicon outer cone (ROC). The beam compactor system 28 is used to expand and compact the light beams to and from the annular gain volume 24. The compacted beam is directed to and reflected from a large turning flat BSM8. The light reflected from the large turning flat BSM8 is directed to a scraper mirror BSM9 with a decentered aperture 30. All of the light beam directed to BSM9 but the portion which is incident on the decentered aperture 30 is reflected from BSM9 forming an output beam. The scraper hole 30 allows a portion of the light beam reflected from the large turning flat BSM8 to pass through BSM9 to the compact leg 26.

In operation, as best shown in FIG. 2, a portion of the light beam reflected from the large turning flat (BSM8) is directed through the decentered aperture 30 in the scraper mirror BSM9 as a light beam 32 and from there to the feedback beam path 31. The balance of the light beam from the large turning flat BSM8 forms an output light beam 34. The light beam 32, directed through the decentered aperture 30 in the scraper mirror BSM9, is reflected from the flat steering mirror BSM1 as a light beam 36. The light beam 36 is directed toward the flat beam steering mirror BSM 2 and reflected therefrom as a light beam 38. The light beam 38 is reflected from the flat beam steering mirror BSM 3 as a light beam 40, which, in turn, is reflected from another flat beam steering mirror BSM11 as a light beam 42. The light beam 42 is directed to the flat beam steering mirror BSM4, which is optically aligned with the waxicon inner cone (WIC). The light beam 42, reflected from the flat beam steering mirror BSM4, is then reflected to the waxicon inner cone (WIC) as the light beam 44. The waxicon inner cone (WIC) transforms the light beam 44 into a radially expanding beam 46 and directs it to the waxicon outer cone (WOC), which forms an annular light beam which is reflected as a light beam 48 to the rear cone mirror BSM6, making a first pass through the annular gain volume 24. The rear cone mirror BSM6 causes the annular beam to be reflected back as a light beam 50 making a second pass through the annular gain volume 24. The annular light beam 50 is directed to the reflaxicon outer cone (ROC), which compacts the annular light beam 50, and directs it to the reflaxicon inner cone (RIC), where it is compacted as light beam 54. The compacted light beam 52 is reflected from the reflaxicon inner cone (RIC) as a compacted light beam 54 which, in turn, is directed and reflected from the large turning flat BSM8. As mentioned above, a portion of the light beam reflected from the large turning flat BSM8 is directed through the decentered aperture 30 in the scraper mirror BSM9 forming a feedback loop while the remaining portion is outcoupled from the resonator forming an output beam 34.

In order to optimize the phase quality of the output beam 34, the various optical surfaces within the resonator 20 must be optically aligned. As will be discussed in more detail below, the alignment system in accordance with the present invention is adapted to provide a relatively simple and systematic method for aligning the various optical surfaces within the resonator 20.

The four mirrored surfaces of the beam compactor mirror system 28 (WIC, WOC, ROC and RIC) are known to be manufactured on a large optics diamond turning machine as two sets of mirror surfaces (WIC-RIC and WOC-ROC). These two sets of mirror surfaces are permanently aligned and mounted together so that the beam compactor mirror system 28 can be considered as a rigid unit. In addition, it is known that during the manufacturing process, an annular reference surface is disposed in a plane normal to the figure axis of the beam compactor system 28 on the WOC-ROC set. The point where the figure axis intercepts this plane is illustrated in FIG. 2 as the point A.

For the purpose of discussion, a reference Cartesian coordinate system is selected as illustrated in FIG. 2. The rotational figure axis of the WIC-RIC unit of a perfectly aligned HEXDARR (and therefore also of the prealigned beam compactor system 28) defines the z axis of the reference Cartesian coordinate system. The positive sense of the z axis is directed toward the gain generator 22 and the rear cone BSM6. The origin of this coordinate system is located on the rotational figure axis of the beam compactor system 25 at point A. The corresponding x and y axes form a right-handed coordinate system with the x axis oriented so that the x, z plane passes through the center of the scraper hole 30.

Prior to implementing the alignment method in accordance with the present invention, the beam compactor system 28 and the rear cone BSM6 are considered to be aligned to each other and to the cylindrical gain generator (shown in FIG. 1) by separate lower-resolution alignment techniques. The beam compactor system 28 and the rear cone BSM6 are assumed to be perfectly aligned, except for a possible translation error in their relative position along the z axis, if the rotational figure axis of the rear cone passes through the RIC tip and point A (and thus also through the WIC tip), i.e., when the figure axis of the rear cone BSM6 coincides with the z axis The rear cone BSM6 is manufactured with an annular reference surface, which is normal to its figure axis, similar to the reference surface of the beam compactor system 28. A point B on the rear cone figure axis is defined to be that point where the rear cone figure axis intercepts the plane defined by the annular reference surface (see FIG. 2). Therefore, by definition, when the rear cone BSM6 is perfectly aligned, point B lies on the z axis.

The alignment tolerance for angular rotation of the rear cone about any axis located in the plane normal to the z axis and passing through point B, includes errors in the alignment angle (rear cone tilt) which can be of the order of a milliradian without seriously degrading optical performance of the HEXDARR 20. A separate angular alignment technique is assumed, which brings the rear cone tilt error to a value which meets this angular alignment criterion.

The displacement of point B from the z axis (rear cone decentration) by a distance of the order of a millimeter in any direction in the plane normal to the z axis can seriously degrade the optical performance of the HEXDARR 22. If a low-resolution rear cone positioning technique, such as simple physical measurement, is used to place point B within a few millimeters of its perfectly aligned position, the method in accordance with the present invention can be used to place point B to within a few tenths of a millimeter of its perfectly aligned position in the plane normal to the z axis, The method in accordance with the present invention makes use of a probe beam derived from an external laser (not shown). This laser is not shown in FIGS. 1 and 2, but the probe beam path itself is indicated. This probe beam is assumed to be a single mode $TEM_{00}$ beam characterized by an azimuthally symmetric gaussian intensity distribution, although any single mode rotationally symmetric form of probe beam may be used instead.

The probe beam is injected into the resonator 20 through the scraper hole 30 by means of a probe beam injection mirror (not shown), placed between BSM8 and the scraper mirror BSM9 (not shown in the figures). The mirrors of the feedback beam path (BSM1, BSM2, BSM3, BSM11 and BSM4) in the figure arranged in space so that they not only guide the probe beam from the scraper hole 30 to the WIC mirror, but also induce an arbitrary rotation of the beam, usually 0° or 90°, about the center of the gaussian intensity distribution (see FIGS. 1 and 2). The compact leg 26 is aligned by independent means for example to produce a centration error of the probe beam on the WIC tip which is less than a millimeter and a propagation direction error of the probe beam at the WIC tip (probe beam and/or compact leg tilt) which is less than a few tens of microradians. This allowable centration error for the probe beam can be shown by simulation, for example, to produce a negligible beam quality degradation for the mode. The beam quality is, however, more sensitive to probe beam and/or compact leg tilt error. The inventive alignment method can be used to reduce this tilt error to less than ten microradians.

The method in accordance with the present invention is based upon the following:

(1) The use of symmetry properties of the probe beam near and far field intensity distribution patterns to aid in the alignment process. The probe beam is initially rotationally symmetric about the center of its gaussian intensity distribution. If the probe beam is aligned, this center is coincident with the center of the scraper hole 30 as the probe beam propagates through the scraper hole 30 after injection into the resonator 20. The edge of the hole 30 will clip the external portions of the gaussian distribution so that only a truncated gaussian distribution propagates past the scraper mirror and into the resonator. This truncated gaussian distribution is still rotationally symmetric about its center if the injected beam is properly aligned and centered in the scraper hole 30. After it is injected into the resonator 20 and propagated a single round trip through the aligned resonator 20, the probe beam intensity distribution, while no longer gaussian, is still rotationally symmetric about the center of its intensity distribution. This center is coincident with the RIC tip position after the beam is reflected from the RIC. This intensity distribution is then incident on and reflected by the scraper mirror BSM9, which contains a scraper hole 30 whose center is not coincident with the center of the incident intensity distribution The intensity distribution after reflection from the scraper mirror BSM9 is no longer rotationally symmetric about the original center (the center of the distribution before reflection from the scraper mirror) because the portion of the beam which was incident on the scraper hole 30 is missing in the reflected beam. Therefore, the reflected beam has an off-center hole, or region devoid of intensity, in it. The symmetry of the reflected beam is therefore reduced to only a simple reflection symmetry about the line connecting the center of this hole 30 in its distribution with what was originally its center before reflection from the scraper mirror. Referring to the Cartesian coordinate system described previously, the reflected beam will have reflection symmetry about the x,z plane (see FIG. 2). The far field pattern obtained from this probe beam field distribution reflected from the scraper mirror BSM9 will also have this same reflection symmetry. The features of the far field pattern exhibiting this reflection symmetry can be enhanced by removing from the probe beam near field more than just the field distribution lying within the scraper hole 30. Removal of any area of the rotationally symmetric probe beam near field by an aperture which has reflection symmetry about the x,z plane, such as the scraper hole 30 itself, will result in a far field with the same reflection symmetry. In the resonator 20, illustrated in FIGS. 1 and 2, the probe beam injection mirror is such an aperture and the area of the near field of the probe beam blocked by the injection mirror is much larger than the area of the scraper hole 30. Therefore, the features of the associated far field will have more prominent reflection symmetry. Any aperture which intensifies the far field features having a particular, non-rotational symmetry will aid in the alignment process.

(2) The far field reflection symmetry is destroyed by any misalignment which does not have the same symmetry. For example, if the rear cone BSM6 is decentered by displacing point B from the z axis to any point not contained in the x,z plane, the resulting far field pattern of the probe beam reflected from the scraper will not have reflection symmetry about the x,z plane. To restore this symmetry, point B does not need to be brought back to its aligned position, but only to a point in the x,z plane. This can be accomplished by translating point B, and hence the rear cone, in the ±y direction until point B lies in the x,z plane. Conversely, if the rear cone BSM6 is translated in the ±y direction, a position can be found where the far field is symmetric about the x,z plane. Thus, by correcting the positions of resonator elements in only one dimension, an intermediate alignment state characterized by reflection symmetry in the far field intensity distribution can be reached. Then, from this intermediate alignment state, by correcting the positions of the resonator elements in the dimension orthogonal to the first dimension, i.e., in the ±x direction, the final fully aligned state can be reached. Thus, what was inherently a two-dimensional search for the aligned position of a resonator element is reduced to two one-dimensional searches.

(3) The appearance of the far field pattern of the probe beam after it propagates one round trip through the resonator 20 may be determined primarily by the effects of decentration of the rear cone BSM6 when the resonator 20 is close to alignment, i.e., when it is aligned by separate means to within the low-resolution tolerances discussed previously. This is true even in the presence of small, otherwise arbitrary, misalignments of other resonator elements. Thus, if the far field lacks the required reflection symmetry, the first step in this alignment concept is to translate the rear cone along the ±y direction until the far field attains the "best" reflection symmetry attainable through this process. In a manual alignment exercise, this is a subjective judgment left to the individual aligning the resonator. In an automatic alignment system utilizing this alignment technique, e.g., sensors which, for example, calculate odd moments of the far field distribution about the x,z plane can be used and their outputs minimized to obtain the "best" reflection symmetry.

(4) The next step in this alignment concept is to translate the rear cone along the ±x direction until the near field phase distribution root-mean-square deviation is minimized.

(5) The next step in this alignment concept is predicated on the observation that the near field intensity distribution of the probe beam, after it is reflected from the scraper, contains nearly circular interference fringes which at this stage of the alignment process will not in general be centered in the intensity pattern, but rather eccentrically aligned, or skewed away from the center of the pattern. These fringes can be centered by introducing a corrective tilt into the probe beam until, in the subjective judgment of the individual aligning the resonator, the centration of the fringes appears to be optimized. The direction of the axis about which the corrective tilt of the probe beam should be carried out is that direction which is orthogonal to the direction in which the fringes are initially skewed.

(6) The steps indicated in (3)–(5) may be repeated until no further corrections are indicated The method in accordance with the present invention depends in part on utilizing an important reflection symmetry property of the near and far field intensity distributions of the probe beam after the beam exits the resonator and is viewed on a scatter plate (not shown). Before injection into the resonator 20, the $TEM_{00}$ gaussian probe beam is, or should be, rotationally symmetric about its direction of propagation. If the departure from rotational symmetry for the injected beam is known quantitatively, it can be factored into the observations and calculations which follow. If this injected beam is suitably aligned (propagation direction parallel to the figure axis of the beam compactor 28) and centered on the scraper hole 30 upon injection, the beam is still rotationally symmetric after it leaves the reflaxicon inner cone (RIC) after a one round-trip propagation through the aligned resonator. This probe beam rotational symmetry property is preserved even in the presence of an arbitrary number of degrees of mode rotation in the compact leg.

If it is assumed that the tolerances on the tilt and decentration errors allowable for the injected probe beam are similar to those for the corresponding compact leg alignment phenomena, the required tolerances on the probe beam are found to be of the order of 10 microradians for the injected probe beam tilt error and 1 millimeter for the injected probe beam centration error.

Figure 3A:
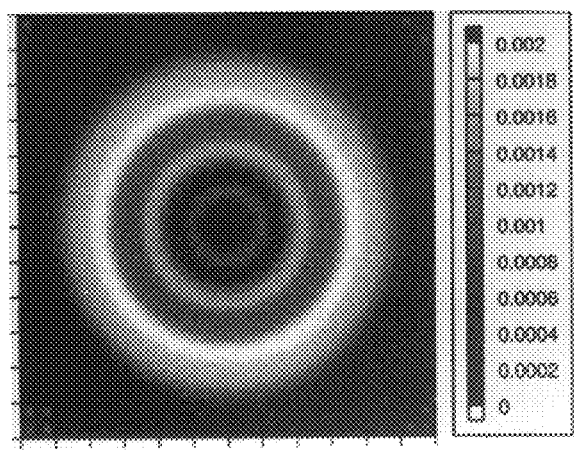
FIGS. 3a, 3b and 3c are the near field intensity, near field phase and far field intensity distribution patterns, respectively of a Gaussian probe beam after the probe beam undergoes a single round-trip passage through the resonator for an aligned resonator.
Figure 3B:
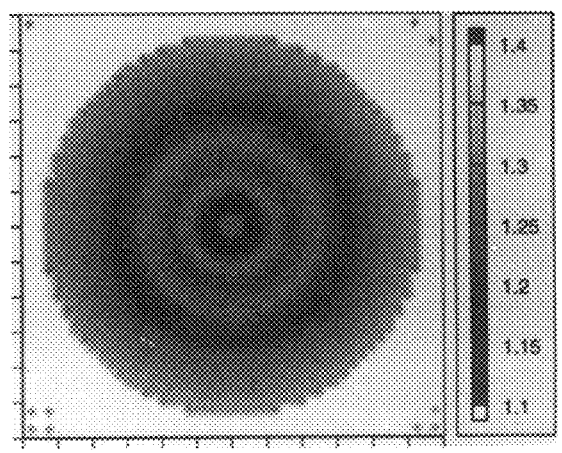
Figure 3C:
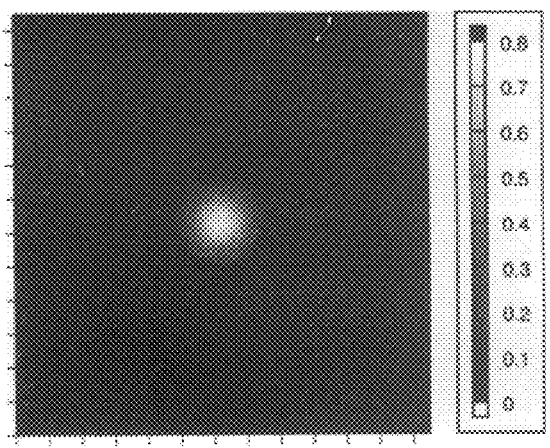

FIGS. 3a and 3b show the near field intensity and phase distributions and FIG. 3c shows the far field intensity distribution associated with an infrared probe beam field distribution immediately after reflection from the RIC of a perfectly aligned experimental or test resonator (not shown). (These figures show properties of the beam before it reflects from the scraper, i.e., no scraper hole is shown. In the near field figures, the various quadrants are indicated as follows: A single dot in the corner of the figure denotes the A quadrant, two dots denote the B quadrant, etc.) The rotational symmetry is evident. The dark Maltese cross pattern in the center of FIG. 3a and the square pattern feature in the center of FIG. 3b are believed to be due to rectangular plotting grid aliasing of what are essentially rotationally symmetric field distributions. In the near field intensity distribution of FIG. 3a, circular interference fringes can be observed which are associated with the two circular apertures intercepted by the probe beam in the cylindrical resonator system as modeled, viz., the scraper hole 30 and the waxicon tip (eversion of the beam between the inner and outer cones of the waxicon maps the inner cone tip into a limiting aperture in the annular leg). If the resonator and probe beam are in an aligned condition, the probe beam intercepts both of these resonator apertures in an azimuthally symmetric manner, so the interference fringes are circular and aligned with the center of the pattern.

Reduction of the initial full rotational symmetry property of the probe beam to only a simple reflection symmetry property about the $\phi=45°$ axis will always occur after reflection of the beam from the scraper mirror because of the presence of the scraper hole ill the B quadrant. The intensity distribution features associated with this reflection symmetry are further enhanced in the alignment procedure by the fact that part of the exiting beam in the region of the scraper hole 30 is apertured in a similar manner as the scraper hole by the backside of a mirror (not shown) used to inject the beam into the scraper hole, resulting in an obscuration of a full quadrant of the beam, viz., the B quadrant, in the near field. The reflection symmetry about the $\phi=45°$ axis caused by the shadow cast by the injection mirror will be perfect only insofar as the injection mirror shadow is perfectly aligned with the x and y axes within the B quadrant. These tolerances are not so tight that a visual inspection which indicates alignment of the shadow is not sufficient Besides the injection mirror obscuration pattern, there generally occurs in the near field a set of more-or-less concentric bright and dark approximately circular interference fringes. The origin of this feature was discussed above in reference to features shown in FIG. 3a. If the fringes are not exactly circular, concentric and centered, then they will appear to be more-or-less off center and eccentrically rather than concentrically, aligned with respect to each other. These fringes are important features for consideration in the alignment process.

The alignment method in accordance with the present invention makes important use of certain observations of the appearance of the near and far field intensity distributions under different conditions of resonator misalignment, particularly the conditions of compact leg tilt and rear cone decentration. When the resonator is close to the aligned configuration, the near field intensity distribution appearance is primarily determined by the presence or absence of compact leg and/or probe beam tilt, while the far field intensity distribution appearance is primarily determined by the presence or absence of rear cone decentration under the same conditions This very useful isolation of the effect of compact leg and/or probe beam tilt from the effect of rear cone decentration when the resonator is nearly aligned depends upon removing the displacement of the far field spot (or spots), caused by compact leg and/or probe beam tilt, from the far field intensity distribution. This is accomplished experimentally by a locked-up fast steering mirror. In other words, the principal effect of compact leg and or probe/beam tilt on the far field intensity distribution is to displace spatially, but not change the relative appearance of, the far field spot pattern. Thus, in the presence of a fast steering mirror and for a resonator configuration which is nearly aligned, the near field intensity distribution becomes a diagnostic primarily for the presence of compact leg and/or probe beam tilt error while the far field intensity becomes a diagnostic primarily for the presence of rear cone decentration error. This allows the angular alignment of the compact leg/probe beam to be conducted separately from the positional alignment of the rear cone in the final stages of the alignment procedure These alignments are not strictly independent, however, but by iterating between them, a perfectly aligned condition can be reached. (The beam compactor is implicitly considered here to be the reference element in these alignment schemes, i.e., the beam compactor is aligned to some absolute reference condition as well as possible by some independent technique, and all other elements are then aligned relative to it by the technique described here.)

Figure 4A:
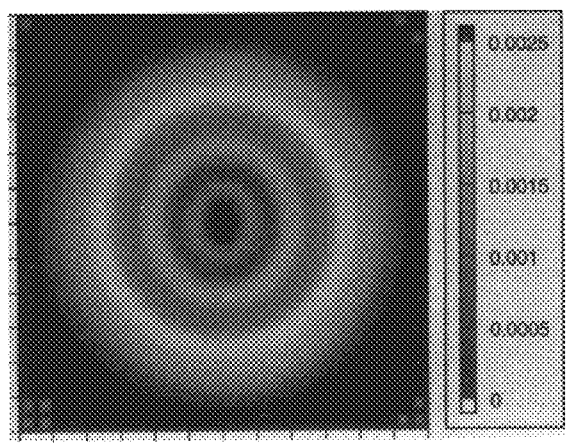
FIGS. 4a, 4b and 4c are graphical illustrations of the near field intensity, near field phase and far field intensity distribution patterns of the Gaussian probe beam with RC tilt=1 mrad about $\phi=-45°$ runs from the center of the figure to the upper right-hand corner of the figure. Thus, $\phi=-45°$ is the direction to the right in the figure.
Figure 4B:
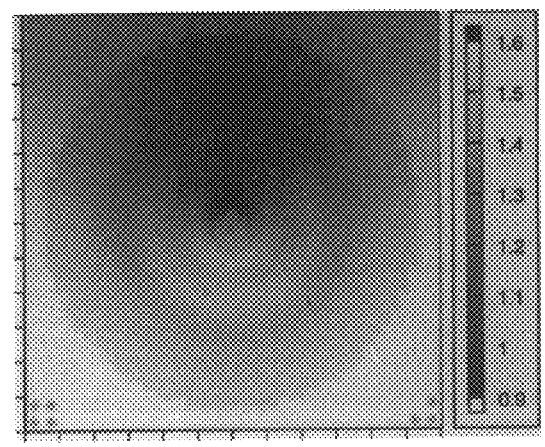
Figure 4C:
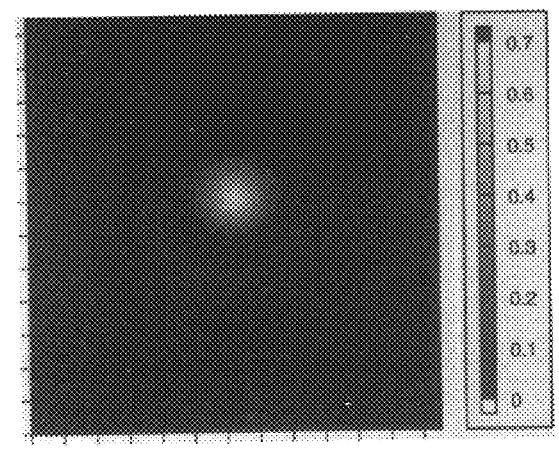

There are two other misalignment modes to be considered. In the above discussion, it has been assumed that the rear cone figure axis has been perfectly aligned parallel to the beam compactor figure axis, i.e., that there is no rear cone tilt present. Rear cone tilt affects the probe beam near and far field intensity distributions minimally if the resonator is close to the aligned condition, i.e., noticeable changes in the appearance of the near and far field intensity distributions due to changes in the angular position of the rear cone occur only when the alignment error in the angular position is of the order of milliradians. For example, FIGS. 4a and 4b show the near field intensity and phase distributions and FIG. 4c shows the simulated far field intensity distribution when the rear cone is tilted by one milliradian about the $\phi=45°$ axis. The nms wavefront error associated with this alignment condition is calculated to be 0.1656 $\lambda$, or 0.4637 microns. Most of this error results from the tilt component introduced into the wave front by this large rear cone tilt. The presence of this tilt is indicated by the fact that the far field central spot, shown in FIG. 4c, is shifted vertically from the center of the figure. The tilt component amounts to a tilt of the near field by only 5 microradians in the presence of a 1000 microradian rear cone tilt. If the tilt and focus components of this near field are removed, then the wavefront error is reduced to 0.0666 $\lambda$, or 0.1865 microns.

Figure 5A:
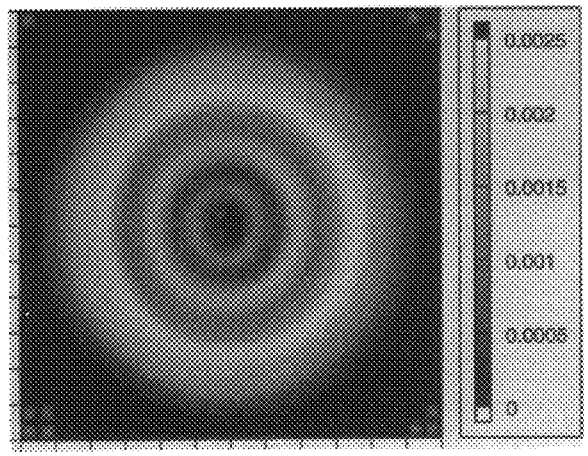
FIGS. 5a, 5b and 5c are the near field intensity, near field phase and far field intensity distribution patterns for a Gaussian probe beam with CL Decenter=1 mm along $\phi=-45°$.
Figure 5B:
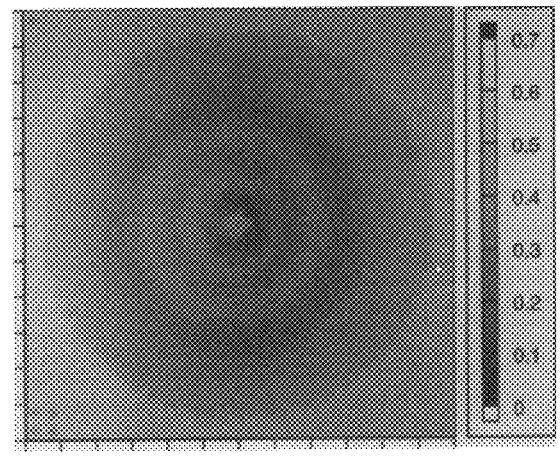
Figure 5C:
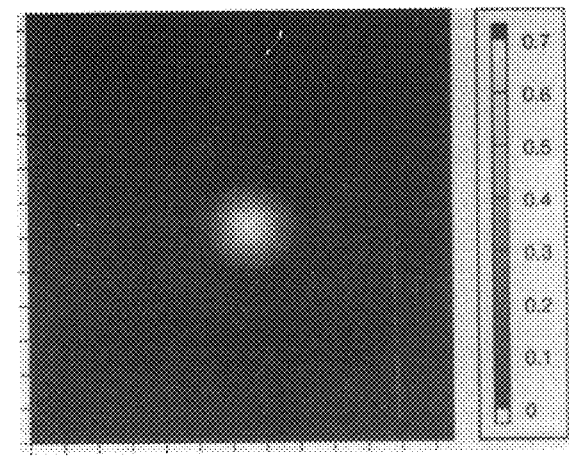

Also, from suitable simulations, the appearance of the output intensity distributions is observed to be similarly relatively insensitive to compact leg/probe beam decentration if the resonator is close to the aligned condition, i.e., noticeable changes in the appearance of the near and far field intensity distributions occur only when the alignment error in the compact leg/probe beam centration is of the order of a millimeter. FIGS. 5a and 5b shows the near field intensity and phase distributions and FIG. 5c shows the far field intensity distribution obtained from simulations of the laser performance when the compact leg is decentered by one millimeter along the $\phi=0°$ axis at the waxicon inner cone (WIC) station. The nns wavefront error for this alignment condition is calculated to be 0.09914 $\lambda$, or 0.2776 microns, which is only slightly different than that for the aligned condition. The slight displacement of the spot in FIG. 5c to the right of the center of the figure is associated with the induced tilt. The rms near field wave front error after the tilt and focus are removed from FIG. 5b is 0.04743 $\lambda$, or 0.1328 microns It is assumed here that independent alignment techniques are available to assure that the rear cone tilt and the compact leg/probe beam decentration can be held to within these tolerances.

The symmetry property associated with the aligned resonator which is used in this alignment scheme is the reflection symmetry about the $\phi=0°$ line passing through the near and far field intensity distributions, i.e., reflection symmetry about a line normal to the axis of the beam compactor and passing through the center of the scraper hole 30 or, alternatively, the line passing through the external corners of the D and B quadrants.

To illustrate the alignment method in accordance with the present invention using results from simulations of the performance of a HEX-DARR laser, for example, as illustrated in the figures, an initial misalignment state for a known resonator was selected and modeled as to what would be seen experimentally at the end of each step in the alignment process. The near and far field patterns obtained for that state of alignment did not posses the reflection symmetry about the $\phi=0°$ that which must be obtained if the resonator is in a fully aligned state and, therefore, the resonator was not aligned. In addition, the associated near field wave front error was rather large, being approximately 1.2 microns.

Figure 6A:
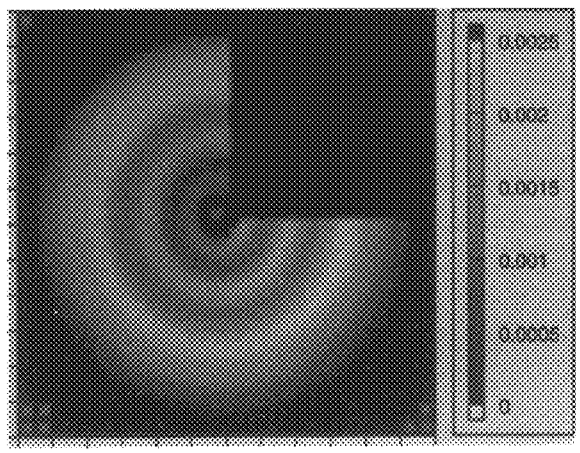
FIGS. 6a, 6b and 6c are the near field intensity, near field phase and far field intensity distribution patterns respectively for a Gaussian probe beam with CL tilt=30 $\mu$rad about $\phi=0°$.
Figure 6B:
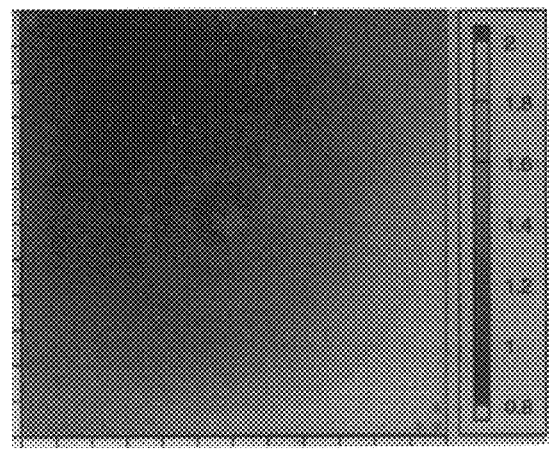
Figure 6C:
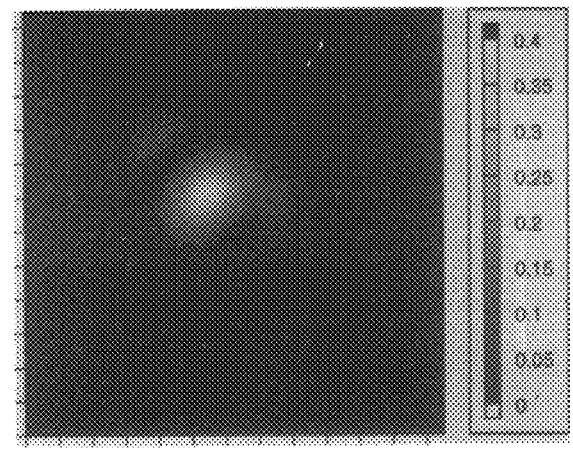

FIGS. 6a, 6b and 6c show a simulation of the effect of just a 30 $\mu r$ compact leg tilt about $\phi=0°$ axis. The tilt axis orientation choice is arbitrary in this example. It is implicitly assumed that the probe beam is aligned. In FIGS. 6a and 6b, the near field intensity and phase distributions for a resonator with the compact leg tilted by 30 mr about $\phi=0°$. The B quadrant is blocked out in FIG. 6a corresponding to the presence of the injection mirror. In FIG. 6c we show the corresponding far field intensity distribution. The rms phase error associated with FIG. 6b is 0.2620 $\lambda$, or 0.7336 microns. Most of this phase error is caused by the tilt component caused by the compact leg tilt. In FIG. 6c, the far field spot is no longer circular as in the previous far field figures, but rather is elongated more or less along $\phi=0°$. The elongation is caused by the near field blockage of the B quadrant. In addition to this effect, the far field spot is displaced along the $\phi=135°$ direction as a result of the compact leg tilt.

Figure 7A:
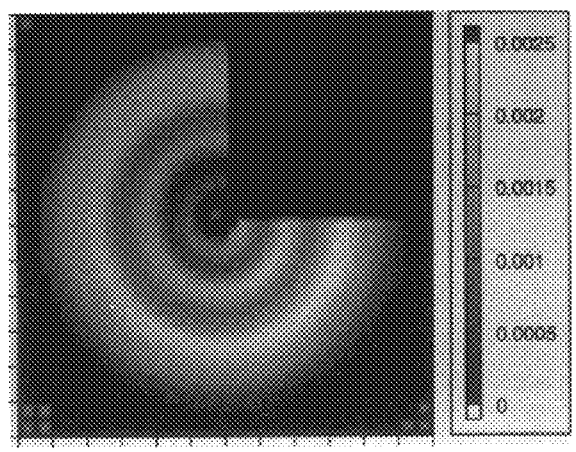
FIGS. 7a, 7b and 7c are the near field intensity, near field phase and far field intensity distribution patterns, respectively, of a Gaussian probe beam with CL tilt=30 $\mu$rad about $\phi=0°$, removed from the near field phase distribution.
Figure 7B:
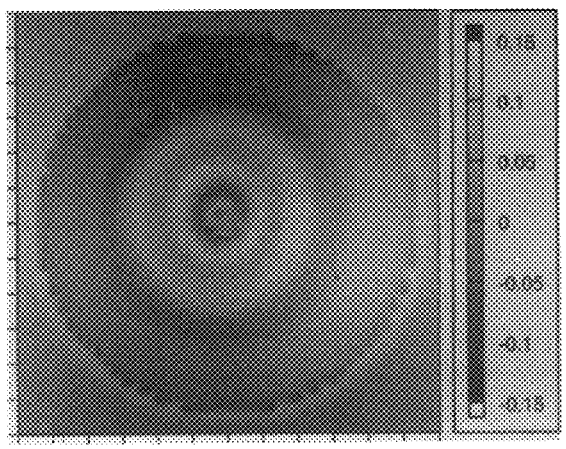
Figure 7C:
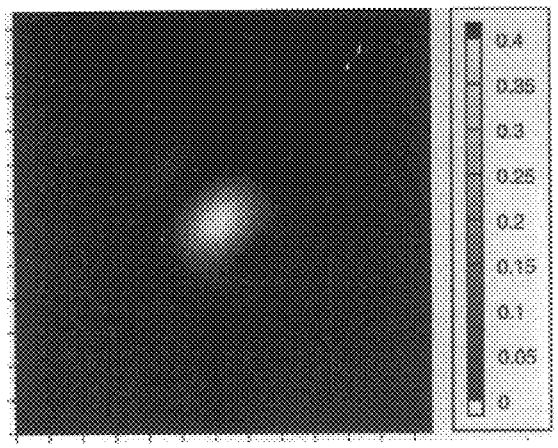

FIGS. 7a and 7b show the near field intensity and phase distributions for the case of FIG. 6, except that the near field phase distribution has had tilt and focus removed. This affects only FIGS. 7b and 7c, of course, so FIG. 7a is the same as FIG. 6a. FIG. 7c shows the corresponding far field intensity distribution. Here the spot is centered in the figure. The wavefront error associated with FIG. 7b is 0.0500 $\lambda$, or 0.1400 microns.

All further far field intensity distributions will be shown with the near field tilt and focus removed. The near field phase distribution plots will, however, contain the tilt and focus components. The rms wavefront error both with and without these components removed will be given. Since the far field intensity distribution shown in FIG. 7c looks much less structured than that for FIG. 8c, the wavefront error for FIG. 8b is much larger than that for FIG. 7b. This is due to the fact that, in addition to compact leg tilt, some probe beam alignment error and some rear cone decentration error were present. In addition, a rear cone displacement of 1.5 mm along the $\phi=-45°$ was introduced.

Figure 8A:
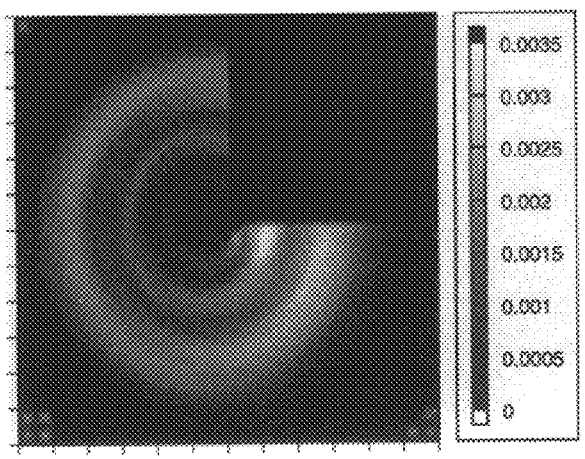
FIGS. 8a, 8b and 8c are the near field intensity, near field phase and far field intensity distribution patterns respectively of a Gaussian probe beam with CL tilt=30 $\mu$rad about $\phi=0°$ and RC decenter =1.5 mm along $\phi=45°$.
Figure 8B:
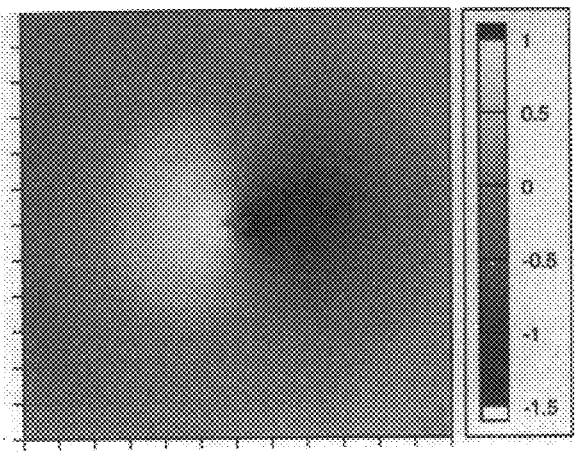
Figure 8C:
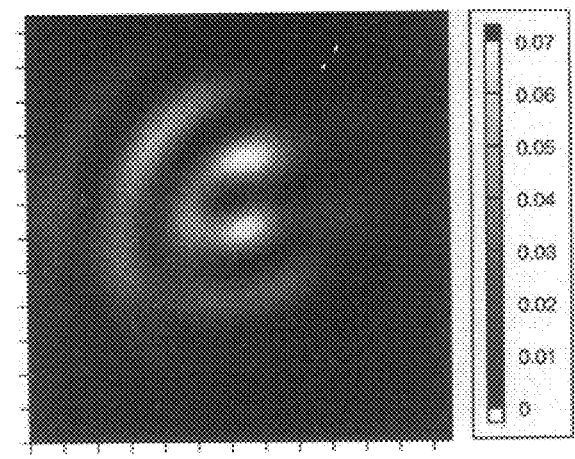

In FIGS. 8a and 8b, the near field intensity and phase distributions are shown for a case where a rear cone decentration in the $\phi=-45°$ direction has been added to the conditions of FIG. 6. The ring-like interference fringe structure is seen in FIG. 8a to be displaced principally in the $\phi=135°$ direction, as it was at the beginning of the alignment exercise. After removal of the tilt and focus from the phase distribution shown in FIG. 8b, the rms wavefront error is 0.2602 $\lambda$, or 0.7286 microns. The far field shown in FIG. 8c is seen to be quite structured, possessing no symmetry about $\phi=45°$.

ALIGNMENT METHOD

STEP 1

The axes are defined in FIG. 2 with the corrector plate removed and above. The near field is observed on the scraper, BSM9. The associated far field is a well-defined term in optical science.

Figure 9A:
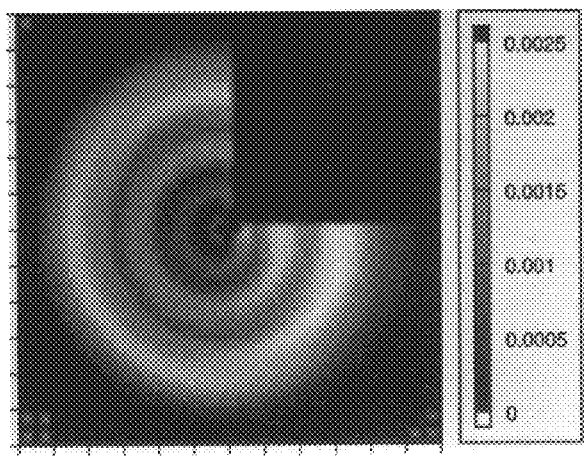
FIGS. 9a, 9b and 9c are graphical illustrations of the near field intensity, near field phase and far field intensity distribution patterns of a Gaussian probe beam with CL tilt=30 $\mu$rad about $\phi=0°$ and RC decenter=1.06 mm along $\phi=-45°$.
Figure 9B:
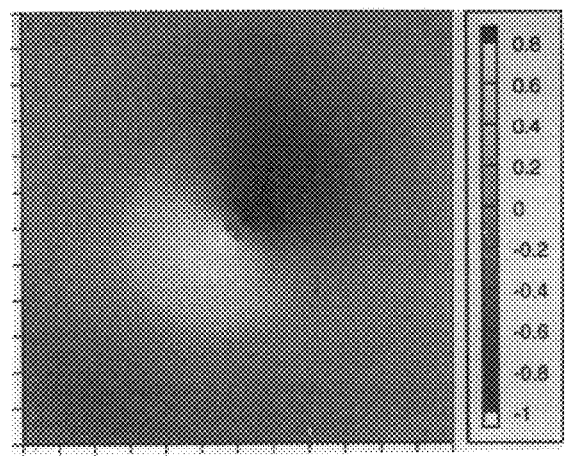
Figure 9C:
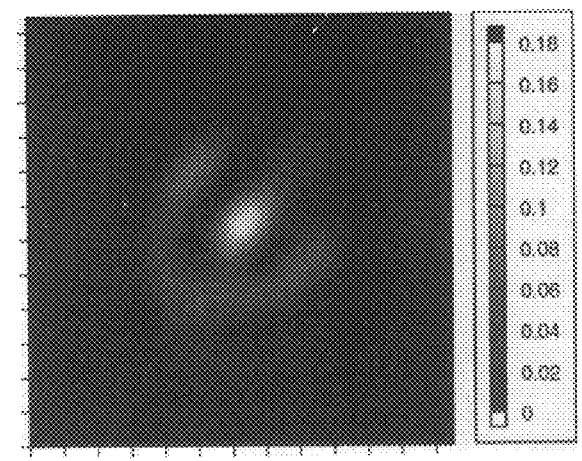

The method for aligning the HEXDARR resonator is presented below If it is assumed that the lack of symmetry for the far field pattern in FIG. 8c is due primarily to a rear cone centration error, which is not located along the $\phi=0°$, 180°, (it is not. of course, since we have decentered the rear cone 1.5 mm along the $\phi=-45°$ axis), then the rear cone can be moved to a position where the centration error is along the $\phi=0°$, 180° axis by displacing the cone along the $\phi=90°$ axis. (Displacement in the opposite direction, i.e., along the $\phi=-90°$ axis, can be shown to make the far field pattern and near field rms phase error "worse".) Adjusting the rear cone position is done first since there is no independent theodolite information that the compact leg tilt error is no more than 30 $\mu$r. Also, the observed far field pattern is too structured to be caused by this compact leg tilt error alone. A similar argument can be made about the effect of probe beam tilt error on the far field pattern in the presence of the fast steering mirror. That is, for tilt errors less than about 150 $\mu$r, the principal effect on the far field is displacement of the pattern and this is removed by the fast steering mirror. FIGS. 9a and 9b show the near field intensity and phase patterns after the cone has been moved in the $\phi=90°$ direction, so that the resulting rear cone decentration error coordinates are 1.06 mm along the $\phi=-0°$ direction. FIG. 9c shows that the resulting far field pattern is relatively symmetric about the $\phi=0°$ axis. The rms wavefront error for FIG. 9b, after removal of tilt and focus, is 0.1982 $\lambda$, or 0.5550 microns, which is lower than that for FIG. 8b.

Figure 10A:
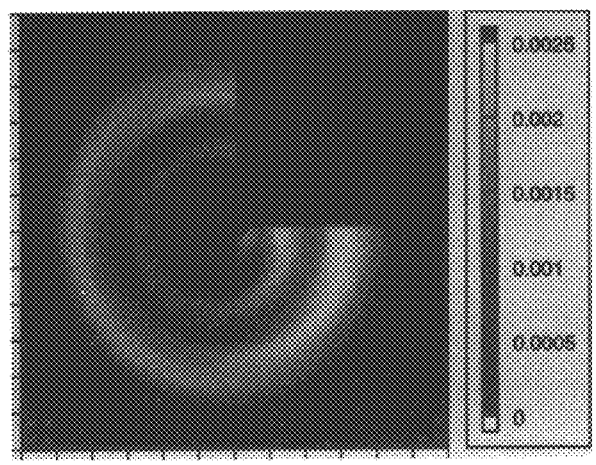
FIGS. 10a, 10b and 10c are graphical illustrations of the near field intensity, near field phase and far field intensity distribution patterns of a Gaussian probe beam with CL tilt=30 $\mu$rad about $\phi=0°$, and RC decenter=1.077 mm along $\phi=10°$.
Figure 10B:
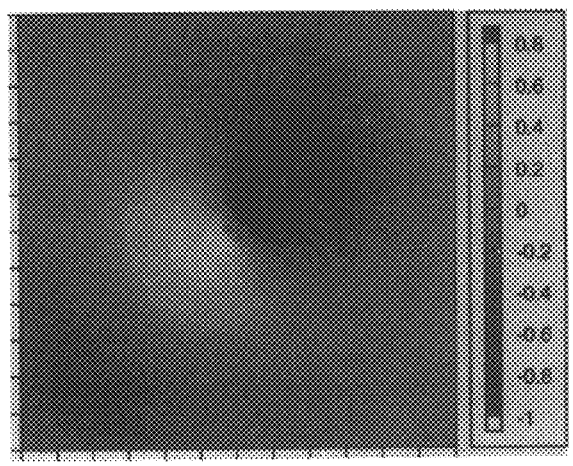
Figure 10C:
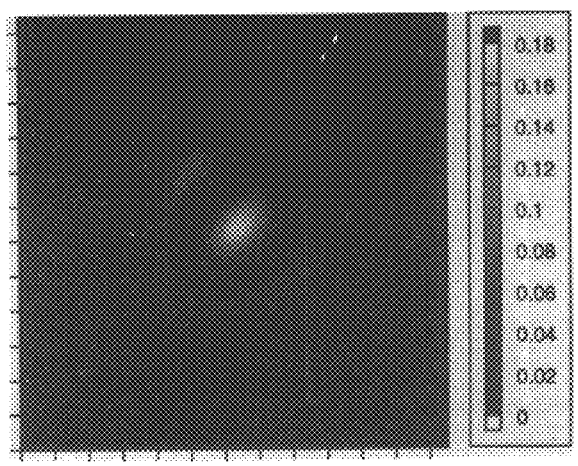

Since experimentally it will not be known exactly when the rear cone centration error is along the $\phi=0°$, 180° axis, this condition is reached by making a subjective judgment about when the "quality" of the reflection symmetry is maximized. FIGS. 10a and 10b show the near field intensity and phase distributions when the decentration is 1.077 mm along the $\phi=-10°$ direction, which is a position along the trajectory of the rear cone decentration adjustment as the cone moves towards the $\phi=0°$ axis. As may be seen, these figures do not look very different than the corresponding ones in FIG. 9. The rms wavefront error for FIG. 10b, however, is actually less than that for FIG. 9b, being 0.1957 $\lambda$. This lower wavefront error probably results from the simultaneous presence of the compact leg tilt. This lower wavefront error for a rear cone decentration which does not lie on the $\phi=0°$, 180° axis will not present a problem for the alignment scheme, however, since the alignment process will be one of iteration between correcting the rear cone position and correcting the compact leg and/or probe beam tilt errors. FIG. 10c shows the resulting far field pattern for this case. The differences between the appearances of FIG. 9c and FIG. 10c are subtle, but in practice it will not matter whether we choose the intermediate alignment condition to be that corresponding to FIGS. 9c or 10c. The iteration process will conclude at the same final alignment condition in either case.

Figure 11A:
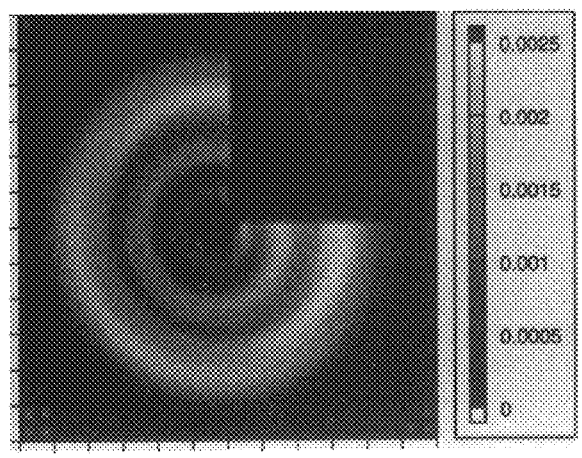
FIGS. 11a, 11b and 11c are graphical illustrations of the near field intensity, near field phase and far field intensity distribution patterns of a Gaussian probe beam with CL tilt=30 $\mu$rad about $\phi=0°$ and RC decenter=1.077 mm along $\phi=10°$ direction.
Figure 11B:
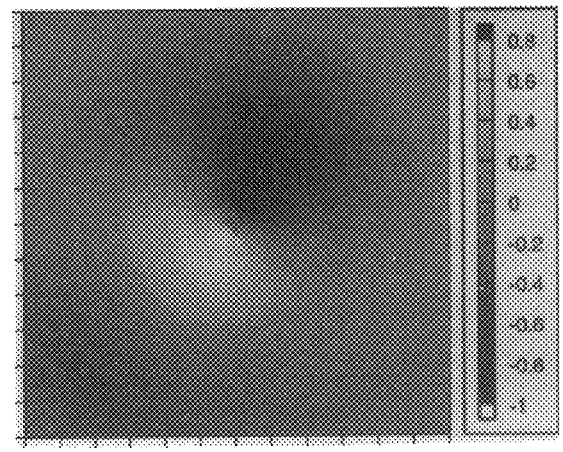
Figure 11C:
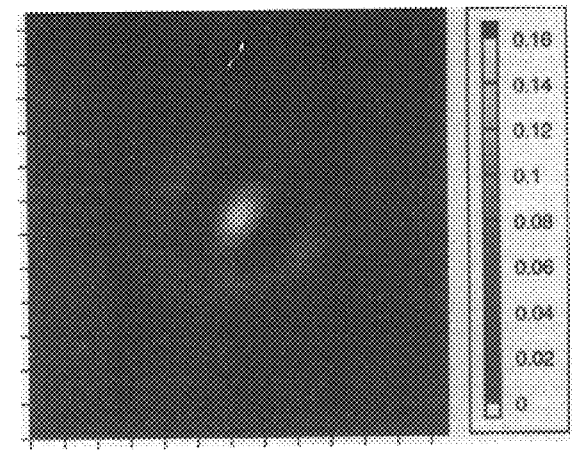

To complete the picture at this step, FIGS. 11a and 11b show the near field intensity and phase distributions for the case where the trajectory of the rear cone adjustment has gone beyond the $\phi=0°$ axis, with the final decentration placed at 1.077 mm along the $\phi=10°$ direction. Again, the near field patterns are minimally different from those of FIGS. 9 and 10. However, the rms wave front error has increased to 0.2067 $\lambda$. The corresponding far field shown in FIG. 11c is not quite as symmetric as in FIGS. 9c and 10c, but even if this intermediate alignment condition is chosen at this step, the iteration process will still lead to the same final aligned condition.

STEP 2

Figure 12A:
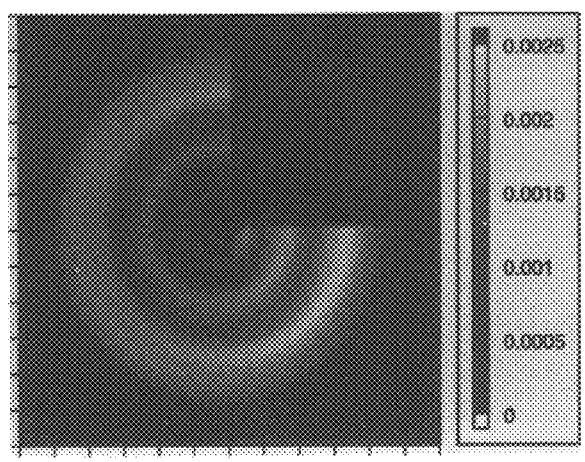
FIGS. 12a, 12b and 12c are graphical illustrations of the near field intensity, near field phase and far field intensity distribution patterns of a Gaussian probe beam with CL tilt=30 μrad about φ=0° and RC decenter=0.53 mm along φ0°.
Figure 12B:
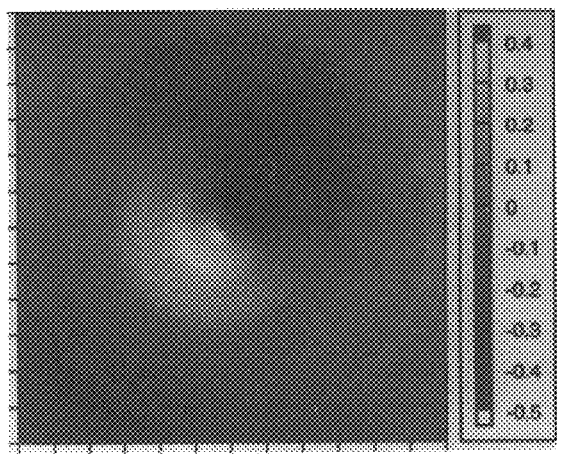
Figure 12C:
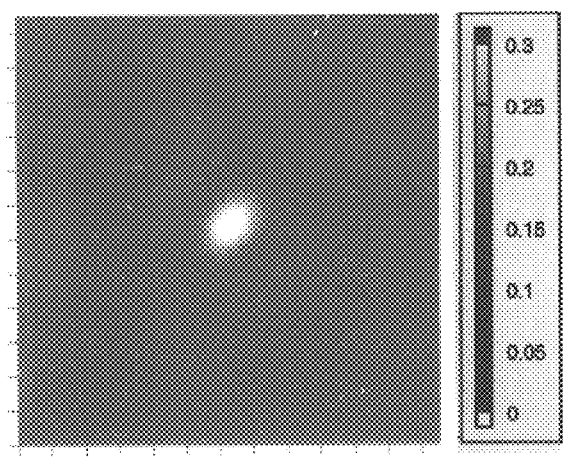
Figure 13A:
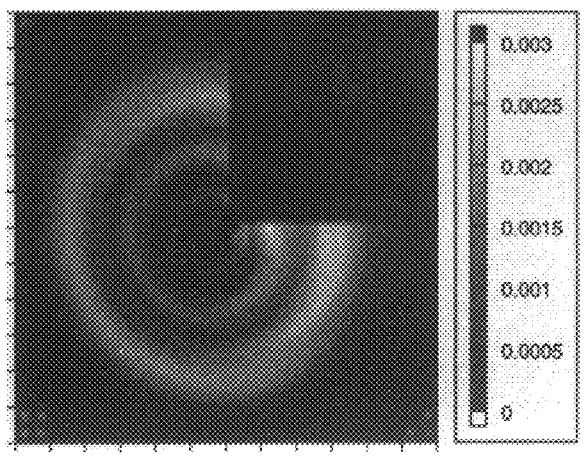
FIGS. 13a, 13b and 13c are graphical illustrations of the near field intensity, near field phase and far field intensity distribution patterns of a Gaussian probe beam with CL tilt=30 μrad along φ=0° and RC decenter=1.59 mm in the direction of φ=0°.
Figure 13B:
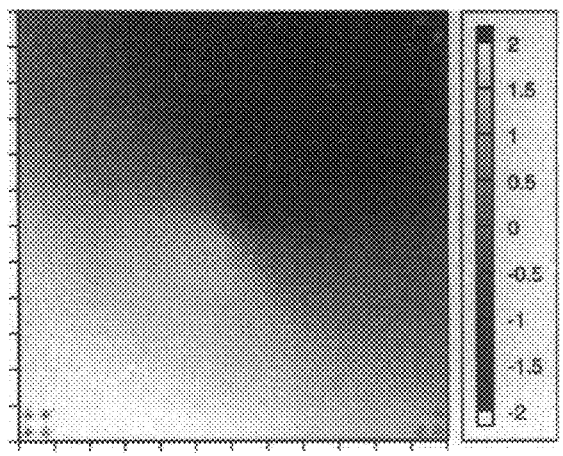
Figure 13C:
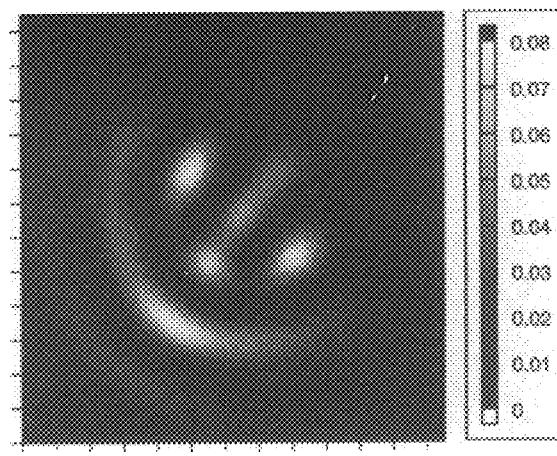

In the second step in the method of alignment, it is assumed that the rear cone position is selected consistent with FIG. 9 at the end of the first step, i.e., a rear cone decentration of 1.06 mm along the $\phi=0°$ degree direction. Of course, the correct position for the rear cone is not precisely known but, based upon symmetry, it should lie in either the $\phi=0°$, 180° direction from our position at the end of the first alignment step. FIGS. 12a and 12b show the near field intensity and phase distributions if the rear cone is moved in the $\phi=180°$ direction half way to the position of perfect alignment for the rear cone, i.e., to a position 0.53 mm along the $\phi=0°$ direction. The rms phase error associated with the near filed is reduced to 0.4420 $\lambda$, or 0.1052 $\lambda$ microns after removal of tilt and focus. FIG. 12c shows the much improved far field pattern. In contrast to this improvement, if the rear cone BSM6 is moved instead the same distance in the $\phi=45°$ direction, i.e., to a position 1.59 mm along the $\phi=45°$ direction, the results are as shown in FIGS. 13a, 13b, and 13c. The wave front error associated with FIG. 13b is increased to 0.3056 $\lambda$ with tilt and focus removed and the far field shown in FIG. 13c has markedly increased in structure (and in reflection symmetry about $\phi=0°$ because the rear cone position is precisely on the $\phi=0°$ line and is the dominant aberration).

Figure 14A:
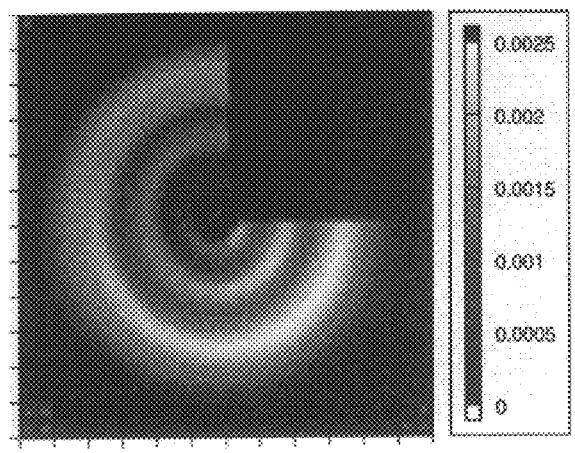
FIGS. 14a, 14b and 14c are graphical illustrations of the near field intensity, near field phase and far field intensity distribution patterns of a Gaussian probe beam with CL tilt=30 μrad about φ=0° and RC decenter =0.187 mm in the direction of φ=10°.
Figure 14B:
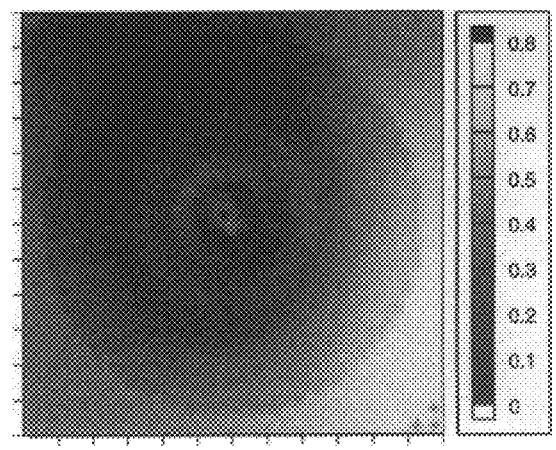
Figure 14C:
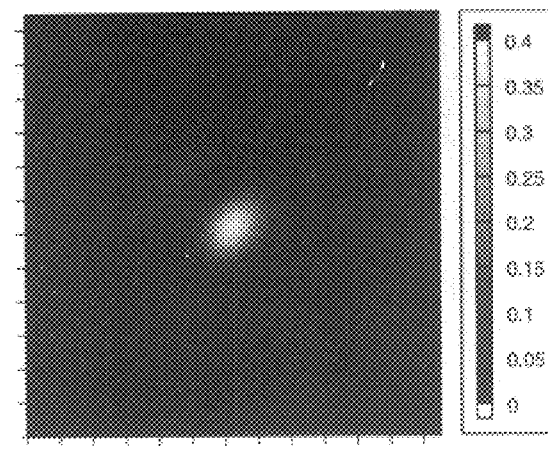
Figure 15A:
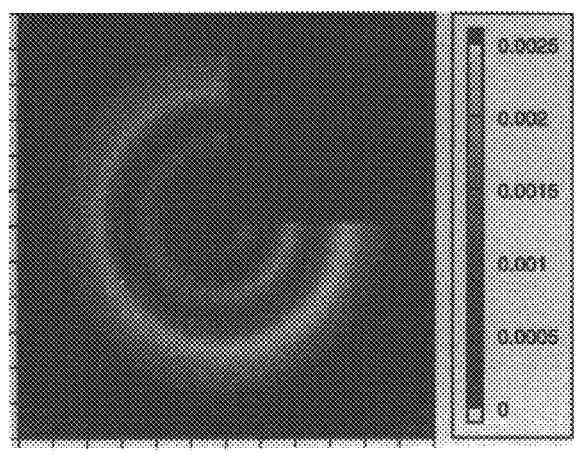
FIGS. 15a, 15b and 15c are graphical illustrations of the near field intensity, near field phase and far field intensity distribution patterns of a Gaussian probe beam with CL tilt=30 μrad about φ=0° and RC decenter =0.1 87 mm in the direction of φ=0°.
Figure 15B:
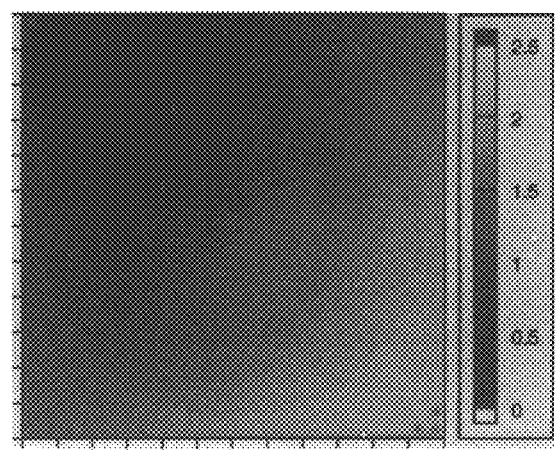
Figure 15C:
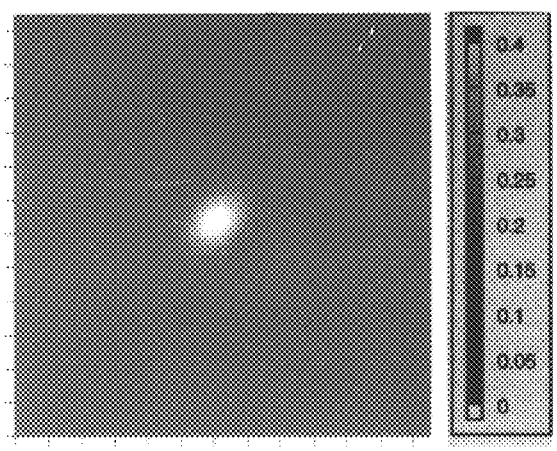

If, instead of the rear cone position associated with FIG. 9, the rear cone position associated with FIG. 10 is erroneously selected as the most reflection symmetric case, then as the rear cone BSM6 is moved in the $\phi=180°$ direction, it will miss the perfectly aligned rear cone configuration. The "distance of the closest approach" to the perfectly centered rear cone, if we start with the case of FIG. 10, can easily be calculated to be a rear cone decentration of 0.1860 mm along the $\phi=-90°$ direction. FIGS. 14a and 14b show the near field intensity and phase distributions, while FIG. 14c shows the far field intensity distribution. The rms phase error associated with FIG. 14b, after removal of tilt and focus, is 0.05431 $\lambda$, which is very close to that of FIG. 7b. Comparison of FIG. 14c with FIG. 7c shows only minor differences but the principal secondary feature of FIG. 14c is a sidelobe oriented in the $\phi=90°$ direction. This could be considered to be a "pointer" that indicates that the aligned position for the rear cone lies a short distance in this direction. In other words, consider the case of choosing instead the rear cone position associated with FIG. 11 as yielding the most "symmetric" intermediate alignment position for the rear cone. Then "distance of closest approach" is calculated to be on the opposite side of the aligned position, i.e., at a rear cone decentration of 0.1860 mm along the $\phi=85°$ direction. FIGS. 15a and 15b show the near field intensity and phase distributions for this case and FIG. 15c shows the associated far field intensity distribution. The rms phase error associated with FIG. 15b is 0.0642 $\lambda$. The sidelobe feature associated with FIG. 15c is now on the opposite side of the main lobe, indicating that the position of best cone alignment is in that direction.

STEP THREE

If the rear cone is moved to the aligned position, then the field patterns correspond to those shown in FIG. 7. For the third step in the alignment process, the "circular" interference pattern is observed to be oriented toward $\phi=90°$ direction. To centrate the fringe pattern so that it looks like that of FIG. 4a, the compact leg mirrors are tilted $-30\ \mu$rad about $\phi=0°$ axis. In this theoretical example, or course, it is assumed that the probe beam has no alignment tilt error and the fringe pattern orientation is entirely due to compact leg tilt error.

If the fringe pattern orientation is due to a combination of probe beam and compact leg tilt errors, then the following procedure can be used to separate the effects if the tilts are very different in magnitude. After the rear cone position has been adjusted as outlined above, any remaining skewing of the fringe pattern can be corrected by tilting the compact leg until the fringe pattern is centered. If the amount of tilt adjustment is much greater than the bounds for compact leg tilt error estimated from the theodolite measurement, then it can be assumed that the excess is due to probe beam tilt misalignment. In any case, if a value is obtained for compact leg tilt adjustment that exceeds the theodolite error estimate, the compact leg is restored to its original state, followed by adjusting the probe beam alignment to centrate the fringe pattern. Nevertheless, compact leg tilt error should not exceed the theodolite error estimate at the end of this alignment. Any remaining errors in the probe beam alignment will not be larger than the theodolite error estimate for the compact leg tilt, since in the above scheme the two tilts will sum to zero. Of course, the final alignment error in the probe beam will not directly affect the resonator performance. The compact leg tilt error, if small enough, primarily affects only the output wave tilt.

Steps 1–3 outlined above can be iterated upon a few times until no further adjustments are indicated. Then the resonator 20 should be considered to be aligned. It should also be understood that the method discussed above can be done manually or can be automated.

Obviously, many modifications and variations of the present invention are possible in light of the above teachings. Thus, it is to be understood that, within the scope of the appended claims, the invention may be practiced otherwise than as specifically described above.

We claim:

1. A method for aligning the optical surfaces of a cylindrical optical resonator having a rear cone a compact leg which includes a scraper mirror with an aperture, method comprising the steps of:

(a) directing a test beam into said aperture of said scraper mirror; and (b) aligning the optical surfaces as a function of predetermined charateristics of said resonator including adjusting the position in two dimensions of the rear cone as a function of the predetermined characteristics of the said cylindrical optical resonator, wherein the two-dimensional adjustment of said rear cone is made into two one-dimensional adjustments, relative to a 3-dimensional cartesian x-y-z coordinate system by:

(1) using a reflection symmetry property of the aligned far field intensity distribution to provide for inital alignment of the rear cone in one dimension;

(2) provising a full alignment of said rear cone by translating said rear cone in the direction orthogonal to said initial alignment to maximize the intensity of the main beam in far field.

2. The method as recited in claim 1, wherein one of said predetermined characteristics is the near field intensity distribution pattern.

3. The method as recited in claim 1, wherein one of said predetermined characteristics is to near field phase distribution pattern.

4. The method as recited in claim 1, wherein one of said predetermined characteristics is the far field intensity distribution pattern.

5. The method as recited in claim 1, wherein the alignment of said rear cone is iterative.

* * * * *